United States Patent [19]
Busigin et al.

[11] Patent Number: 5,154,878
[45] Date of Patent: Oct. 13, 1992

[54] PROCESS AND APPARATUS FOR TRITIUM RECOVERY

[76] Inventors: Anthony Busigin, 1239 Sir David Drive, Oakville, Ontario, Canada, L6J 6Y9; Savtantar K. Sood, 5748 Riverside Place, Mississauga, Ontario, Canada, L5M 4W5; Kuthur M. Kalyanam, 15 Pine Knoll Gate, Thornhill, Ontario, Canada, L3T 1V4

[21] Appl. No.: 516,733

[22] Filed: Apr. 30, 1990

[51] Int. Cl.$^5$ .............. G21C 19/42; G21B 1/00; B01D 59/10; C01F 13/00
[52] U.S. Cl. .................. 376/310; 376/146; 55/16; 55/17; 55/158; 423/249; 423/255
[58] Field of Search ............ 376/310, 146; 423/249, 423/255; 55/16, 17, 158

[56] References Cited

U.S. PATENT DOCUMENTS

| | | | |
|---|---|---|---|
| 3,155,467 | 11/1964 | Yamamoto et al. | 55/16 |
| 3,505,017 | 4/1970 | Roth | 423/580 |
| 4,173,620 | 11/1989 | Shimizu | 423/249 |
| 4,180,388 | 12/1979 | Graham et al. | 55/16 |
| 4,190,515 | 2/1980 | Butler et al. | 204/266 |
| 4,217,332 | 8/1980 | Hindin et al. | 423/249 |
| 4,353,871 | 10/1982 | Bartlit et al. | 422/159 |
| 4,395,386 | 7/1983 | Asakura et al. | 423/249 |
| 4,494,965 | 1/1985 | Ali-Khan et al. | 55/16 |
| 4,496,373 | 1/1985 | Behr et al. | 55/16 |
| 4,533,539 | 8/1985 | Iniotakis et al. | 423/648 |
| 4,659,554 | 4/1987 | Levinson et al. | 423/249 |
| 4,687,644 | 8/1987 | Iniotakis et al. | 422/159 |
| 4,699,637 | 10/1987 | Iniotakis et al. | 55/158 |
| 4,774,065 | 9/1988 | Penzhorn et al. | 423/210 |
| 4,849,155 | 7/1989 | Penzhorn et al. | 376/146 |
| 4,875,945 | 10/1989 | Penzhorn et al. | 376/146 |

OTHER PUBLICATIONS

Ohara et al., "Fuel Purification System for a Tokamak Type Fusion Reactor", Fusion Engineering, Proceedings, vol. 1, 12th Symposium on Fusion Engineering, Oct. 12-16, 1987, Montery, CA.
Kerr et al., "Fuel Cleanup System for the Tritium Systems Test Assembly", Proceedings of ANS Topical Meeting, Tritium Technology in Fission, Fusion and Isotopic Application, 1980.

Primary Examiner—Brooks H. Hunt
Assistant Examiner—Daniel J. Jenkins

[57] ABSTRACT

The invention provides a new high temperature isotopic exchange fuel processing loop for tritium recovery in which tritium is exchanged out of impurities such as tritiated ammonia, methane and water by swamping with $H_2$ and isotopically equilibrating the mixture in a high temperature reactor. Downstream of the reactor is a Pd/Ag permeator for separation of the hydrogen from the impurities, the separated hydrogen being sent to an isotope separation system for tritium recovery and the residual impurities being recycled. The process eliminates the need for impurity oxidation and electrolysis of DTO and does not rely on complicated catalytic decomposition reactions.

12 Claims, 1 Drawing Sheet

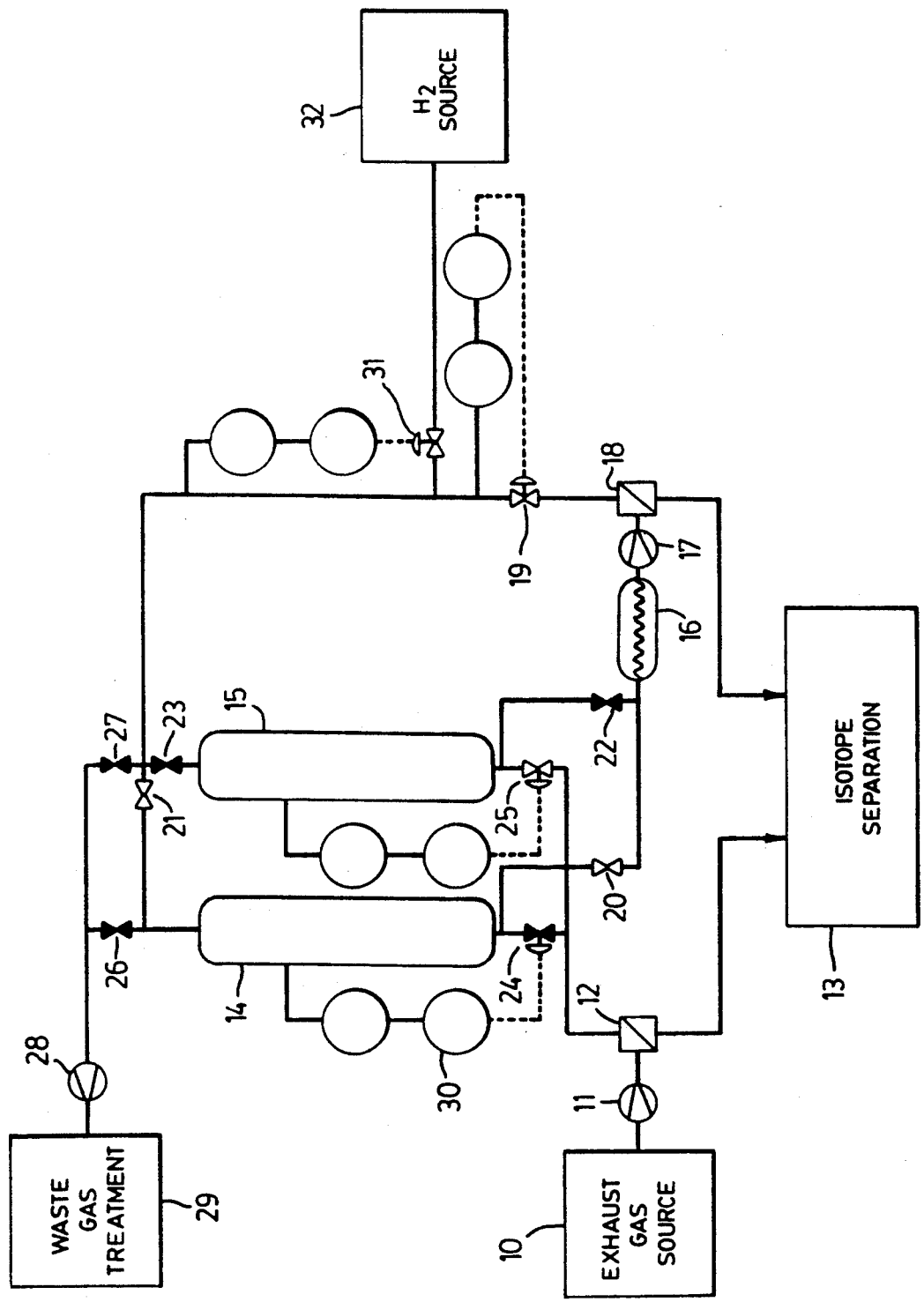

PROCESS AND APPARATUS FOR TRITIUM RECOVERY

FIELD OF THE INVENTION

This invention relates generally to a process and apparatus for the recovery of tritium from gases consisting primarily of a mixture of isotopes of hydrogen with impurities containing tritium in chemically bound form. One application of the invention is to the cleaning up of exhaust gas from a nuclear fusion reactor.

BACKGROUND OF THE INVENTION

In the recovery of tritium from the exhaust gas of a nuclear fusion reactor, elemental hydrogen isotopes must be separated from other gas components, i.e. impurities, the elemental hydrogen isotopes being further processed for separation of the components protium, deuterium and tritium, and the impurities being sent to waste disposal. However, since the impurities generally contain tritium in chemically bound form, this must be recovered before the impurities can be safely disposed of. The separation of impurities from the exhaust gas and the processing of impurities to recover tritium is accomplished by a fuel processing loop.

The main requirement for the fuel processing loop (FPL) is to receive tritiated hydrogen ($Q_2$ where $Q=H$, D or T) streams containing small amounts of impurities such as $C_nQ_m$, CO, A, $CO_2$, $N_2$, $NQ_3$, $O_2$, and $Q_2O$, to separate the tritiated hydrogen from the impurities, and to send it in the form $Q_2$ to the isotope separation system for final tritium purification. The remaining tritium-depleted impurities are sent to a waste gas treatment system.

A number of different FPL processes have been proposed:

Pd/Ag Permeation with Catalytic Impurity Decomposition [R.-D. Penzhorn, R. Rodrigues, M. Gugla, K. Günther, H. Yoshida and S. Konishi, "A Catalytic Plasma Exhaust Purification System", Fusion Technology 14, p. 450, 1988.]Hydrogen isotope purification by palladium/silver alloy permeators combined with selective catalytic decomposition reaction steps which avoid intermediate conversion of impurities into water.

Catalytic Oxidation with Hot U-Bed Water Decomposition [J. L. Hemmerich, A. Dombra, C. Gordon, E. Groskopfs and A. Konstantellos, "The Impurity Processing Loop for the JET Active Gas Handling Plant, Fusion Technology 14, p. 450, 1988.]All impurities are fully oxidized in a catalytic recombiner, the tritiated water frozen in a cold trap and subsequently decomposed on hot uranium powder. Hydrogen isotopes set free in this reaction are scavenged from the He carrier gas in a cold U-Bed.

Pd/Ag Permeation with Catalytic Oxidation and Electrolysis [S. Konishi, M. Inoue, H. Yoshida, Y. Naruse, H. Sato, K. Muta and Y. Imamura, "Experimental Apparatus for the Fuel Cleanup Process in the Tritium Processing Laboratory", Fusion Technology 14, p. 596, 1988.]Hydrogen isotopes are separated from impurities by a Pd/Ag permeator. All tritiated impurities are oxidized and the tritiated water is electrolysed to form elemental hydrogen isotopes which are removed by a second Pd/Ag permeator.

Hot U-Bed Impurity Decomposition and Cryogenic Adsorption [P. Schira and E. Hutter, "Tritium Cleanup on Hot Uranium Powder", Fusion Technology 14, p. 608, 1988.]The process gas to be purified is passed through hot beds containing fine uranium powder. In this step, the impurity compounds are cracked and the elements 0, C and N are adsorbed as uranium oxides, carbides and nitrides. At temperatures of 500° C. and above, the hydrogen isotopes no longer produce hydrides with uranium and pass through the bed. In a downstream molecular sieve, all remaining impurities and some hydrogen are cryogenically adsorbed at $-196°$ C.

Cyrosorption, Catalytic Oxidation and Electrolysis [A. Ohara, K. Ashibe and S. Kobayashi, "Fuel Purification System for a Tokamak Type Fusion Reactor", Fusion Engineering, Proceedings Volume 1, 12-th Symposium on Fusion Engineering, Oct. 12-16, 1987, Monterey, Calif., p. 743.][E.C. Kerr, J.R. Bartlit, and R. H. Sherman, "Fuel Cleanup System for the Tritium Systems Test Assembly", Proceedings of ANS Topical Meeting, Tritium Technology in Fission, Fusion and Isotopic Application, 1980, p. 115]. Cryogenic adsorption is used to separate impurities other than helium. The separated impurities are then catalytically oxidized to convert $NQ_3$ and $C_nQ_m$ to $Q_2O$, $H_2O$ and $N_2$. The water is then electrolysed and sent to the isotope separation system.

In all the above designs, it has been assumed that the FPL must decompose all the $C_nQ_m$, $Q_2O$ and $NQ_3$ impurities into a $Q_2$ stream, which is then sent to the isotope separation system. No consideration has been given to simply swamping the impurity stream with $H_2$ and then exchanging the tritium in the impurity compounds with protium (H). This approach has probably not been considered because it would increase the H/T separative duty of the isotope separation system. However, applicants' recent design studies have shown that sizing of the isotope separation system for H/T separation is determined mainly by requirements for waste water detritiation and pellet injector propellant cleanup. The addition of a small additional $H_2$/HD/HT stream from the FPL has virtually no impact on the isotope separation system design.

The object of this invention is to provide an improved process for the recovery of tritium based on the aforementioned discovery.

SUMMARY OF THE INVENTION

Accordingly, the invention provides a process for recovering tritium from a gaseous mixture consisting of elemental hydrogen isotopes with impurities containing tritium in chemically bonded form, comprising (a) separating the gaseous mixture into an impurity-free first fraction consisting essentially of elemental hydrogen isotopes and a second fraction containing the impurities, (b) adding tritium-lean hydrogen to the second fraction, (c) equilibrating the added hydrogen with the tritium-containing impurities of the second fraction, (d) separating the equilibrated mixture into an impurity-free enriched fraction consisting essentially of elemental hydrogen isotopes and a depleted fraction containing the impurities, repeating steps (b), (c) and (d) in continuous cyclic sequence on said depleted fraction until the impurities are sufficiently depleted of tritium, disposing of the depleted impurities, and separating the isotopes of said impurity-free fractions.

The process may be a batch process, the impurity-containing fraction of each batch being continuously recycled until the impurities are sufficiently depleted of tritium, the gas in the fuel processing loop being maintained at a substantially constant pressure.

A particular advantage of the process is that it avoids oxidation of the impurity compounds to form $Q_2O$ and hence avoids subsequent tritiated water handling and reduction. Also, in contrast to existing processes, the process of the invention does not rely on complex chemical decomposition reactions with the consequent unpredictability.

BRIEF DESCRIPTION OF THE DRAWINGS

A preferred embodiment of the invention, as applied to a nuclear fusion reactor fuel processing system plasma clean-up loop will now be described with reference to the accompanying drawing which is a simplified schematic of the fuel processing system showing the essential components of the plasma clean-up loop.

DESCRIPTION OF THE PREFERRED EMBODIMENT

The system illustrated schematically in the drawing is designed to process a torus vacuum exhaust gas stream from a nuclear fusion reactor. The exhaust gas typically has the following composition:

| | |
|---|---|
| DT | 0.937 mole fraction |
| H | 0.010 mole fraction |
| He | 0.033 mole fraction |
| Impurities | 0.020 mole fraction |

The nominal flow rate is 75 mole/h. The impurities contain tritium, as well as deuterium and protium, in chemically bound form. Thus, the impurities typically include CO, $CO_2$, $N_2$, $C_nQ_m$, $NQ_3$, $O_2$, $Q_2O$, and Ar, where $Q = H$, D or T. The purpose of the clean-up loop is to recover the heavier hydrogen isotopes contained in the impurities.

Referring to the drawing, the gaseous mixture to be processed is pumped from the source 10 by a pump 11 to a Pd/Ag permeator 12, which separates the mixture into an impurity-free first fraction consisting essentially of elemental hydrogen isotopes and a second fraction containing the impurities. The first fraction passes to a cryogenic distillation system 13 for separating the isotopic components of the elemental hydrogen isotopes. In principle, the permeator 12 could be replaced by another separating device such as a cryogenic adsorber operated at a temperature of 77° K. However, a permeator has been selected in the present example to minimize tritium inventory. The residual impurity-containing fraction of the gaseous mixture is processed batchwise in the plasma clean-up loop, the successive batches being stored in pressure vessels 14, 15.

The plasma clean-up loop includes a high temperature isotopic exchange reactor 16, a circulating pump 17, a Pd/Ag permeator 18, and a flow regulating valve 19. The pressure vessels 14, 15 can be selectively connected in the loop by valves 20, 21 and by valves 22, 23 respectively. The pressure vessels are interconnected with the permeator 12 by respective valves 24, 25 to receive the gas to be processed, and are connected via respective valves 26, 27 and a pump 28 to a waste gas treatment system 29 for the disposal of the detritiated impurities.

Initially, both pressure vessels having been evacuated, the valve 24 is opened to admit the impurity-containing fraction from the permeator 12, the valve 25 remaining closed. When the pressure of gas in the first pressure vessel 14 reaches a certain value, say 25 kPa as measured by a pressure measuring means 30, the valve 24 is closed and the valve 25 is opened so that the flow of impurity-containing gas from permeator 12 is redirected into the second pressure vessel 15 in readiness for a second batch. At this time the pressure vessel 14 is connected in the clean-up loop and a pressure responsive valve 31 is opened to admit tritium-lean hydrogen into the loop from a hydrogen source 32. The admission of hydrogen continues until the gas pressure reaches 100 kPa, at which time the circulating compressor 17 is started. The circulating compressor 17 draws the mixture of impurities and elemental hydrogen isotopes through the reactor 16 where the mixture is isotopically equilibrated.

Downstream of the reactor 17, the elemental hydrogen isotopes are removed via the permeator 18, the removed hydrogen isotopes being passed to the cryogenic distillation system for isotope separation. The residual impurity-containing fraction is recycled back to the pressure vessel. Hydrogen addition continues in order to maintain a pressure of 100 kPa in the pressure vessel 14, until the quantity of hydrogen added is equivalent to twenty volume changes of the pressure vessel. This should reduce the tritium content of the first batch by a factor of $e^{-20}$, which is approximately $2 \times 10^{-9}$, making it possible to discharge the remaining impurities directly to the environment. Circulation of the gas through the loop is continued, even after the hydrogen addition is stopped, until most of the hydrogen isotopes in the batch have permeated through the permeator 18 to the isotope separation system 13. The circulating compressor 17 is then stopped and the system is evacuated. The valve 26 is opened and the detritiated impurities are sent to the waste gas treatment system 29.

The second batch of impurity-containing gas in the pressure vessel 15 is next processed in the same way.

The process does not contain any components which require a long cycle time for operation, such as molecular sieve beds which require time for regeneration. Therefore, to minimize tritium inventory, a short cycle time of, say, four hours can be used.

An important feature of the process design is that the Pd/Ag permeators 12, 18 need not be designed for a clean separation between impurities and the hydrogen species ($Q_2$), since the process does not rely on the efficiency of this step for a high degree of impurity detritiation. This feature of the process significantly reduces the size of the permeators as compared with other Pd/Ag designs. The permeator 12 is sized to maintain the partial pressure of the hydrogen species ($Q_2$), sent to the pressure vessel 14 (or 15) to 25% of the total pressure. This separation efficiency is comparable to that of a molecular sieve adsorber. Indeed, the permeator 12 could be replaced by a molecular sieve cryoadsorber with very little effect on the downstream process design.

It can be assumed that, at the end of four hours of accumulation of impurities plus residual hydrogen isotopes in the pressure vessel 14, the oxygen in the original plasma exhaust gas stream has reacted to form $Q_2O$ in the permeator 12. This is a reasonable assumption, since the permeator 12 provides a large hot catalytic surface to promote this reaction. Based on this assumption, the contents of the pressure vessel before and after swamping with hydrogen are shown in Table 1.

TABLE 1

| Component | Partial Pressure (kPa) Initial | Partial Pressure (kPa) After H$_2$ Swamping |
|---|---|---|
| Q$_2$ | 6.25 | 81.25 |
| He | 12.13 | 12.13 |
| C$_n$Q$_m$ | 4.12 | 4.12 |
| NQ$_3$ | 0.29 | 0.29 |
| Q$_2$O | 0.44 | 0.44 |
| CO | 0.59 | 0.59 |
| A | 0.29 | 0.29 |
| CO$_2$ | 0.29 | 0.29 |
| N$_2$ | 0.59 | 0.59 |

Accordingly, since the pressure vessel is at ambient temperature (300° K.), the volume of the pressure vessel is 2.0 m$^3$.

In the process described, the addition of tritium-lean hydrogen to the pressure vessel continues over the first 3.5 hours of the 4 hour cycle. The total quantity of hydrogen added is 20 times the pressure vessel volume, or 40 m$^3$ at 300° K. temperature and 100 kPa pressure (1600 mole total). On this basis, the hydrogen addition rate is 11.4 m$^3$/h or 457 mole/h. The permeator 18 is therefore designed to permeate 457 mole/h of H$_2$, since swamping ensures that Q$_2$ is mainly in the form of H$_2$. The partial pressure of Q$_2$ in the stream returning from the permeator 18 to the pressure vessel is 25% of the total pressure. Therefore, the total flowrate through the reactor 16 and to the permeator 18 is 610 mole/h.

Design of the High Temperature Isotopic Exchange Reactor

At room temperature, isotopic equilibration between gaseous species such as methane and hydrogen is extremely slow. To improve the rate of reaction, one must contact the gaseous mixture with a metal catalyst at a high temperature. Unfortunately, with tritium present, when designing a conventional packed bed type catalytic reactor one is faced with two competing objectives:

1. In order to minimize the size of the reactor, the operating temperature of the reactor should be as high as possible.
2. In order to minimize tritium permeation into and through the walls of the reactor, the operating temperature of the reactor should be as low as possible.

In view of these competing objectives, a hot-wire reactor is best suited for promoting the isotopic exchange reaction. The hot-wire reactor consists of a horizontal tube with an axial coiled Pt metal hot-wire operated at a temperature of 1173° K. (or higher). The hot-wire is prevented from coming into contact with the walls of the reactor vessel by suitably positioned ceramic spacers.

The attractive features of the hot-wire reactor are:
1. The reactor is small, since the wire is very hot and the reaction rate at the hot-wire surface is rapid.
2. Since the hot-wire is not in contact with the walls of the reactor, the walls of the reactor vessel can be maintained near room temperature to ensure that tritium permeation through the reactor walls is negligible.
3. In a hydrogen environment, poisoning of the Pt hot-wire cannot occur, since the operating temperature is sufficiently high to desorb or hydrogenate catalyst poisons such as CO. The efficiency of the reactor is, therefore, not likely to decrease with time.

The walls of reactor 16 are maintained at a temperature of 350° K. (or less) by cooling water flow through a water jacket. The average gas temperature in the reactor is about 500° K., which results in a total volumetric flowrate through the reactor at 100 kPa pressure of 0.0070 m$^3$/s. The diameter of the reactor vessel is 0.15 m and the length is 2.0 m, which gives a total volume of 0.035 m$^3$, a superficial velocity of about 0.43 m/s, and a residence time of about 5.0 s.

The equilibration efficiency in reactor 16 is determined by the rate of transport of reactants and products to and from the hot-wire surface, the residence time in the reactor, and the reaction rate on the hot-wire surface. Except for a short period of time at the beginning of the swamping operation, the equilibration reactions of interest are:

$$CH_3T + H_2 = CH_4 + HT \quad (1)$$

$$NH_2T + H_2 = NH_3 + HT \quad (2)$$

$$HTO + H_2 = H_2O + HT \quad (3)$$

The sequence of steps involved in the surface catalyzed reactions are:
1. Transport of reactants to surface.
2. Adsorption of reactants on surface.
3. Equilibration of reactants on surface (formation of products).
4. Desorption of products from surface.
5. Transport of products away from surface.

The overall rate of equilibration is determined by the slowest of these steps, which is usually step 2 or 4 at low temperature, or steps 1 and 5 at high temperature.

The hot-wire in reactor 16 has a diameter of 0.001 m and a length of 10 m, based on heat and mass transfer calculations which are discussed below.

Convective Heat and Mass Transfer

The heat and mass transfer in the reactor is due to the 0.43 m/s superficial velocity through the reactor, as well as to thermal convection. Since the superficial velocity is quite low, the heat and mass transfer in the reactor is mainly due to thermal convection caused by the very high temperature of the wire and the cold reactor walls. The thermal convection ensures that the gaseous contents of the reactor are well mixed.

The convective heat transfer from the wire is a function of the Grashof number Gr and the Prandtl number Pr, which are given by:

$$Gr = \frac{D^3 \rho^2 g (T_w - T_g)/\overline{T}}{\mu^2} \quad (4)$$

$$Pr = \frac{C_p \mu}{k} \quad (5)$$

where D is the wire diameter (m): $\rho$ is the gas density (kg/m$^3$); g is the acceleration due to gravity (9.8 m/s$^2$), $T_w$ is the temperature of the wire (K); $T_g$ is the temperature of the gas (K); $\overline{T} = 0.5(T_w + T_g)$ is the mean temperature in the boundary layer at the hot-wire surface; $\mu$ is the viscosity of the gas (kg/m.s); $C_p$ is the heat capacity of the gas at constant pressure (J/kq.K); and k is the thermal conductivity of the gas (J/s.m.K).

The physical properties $\rho$, $\mu$, $C_p$ and k are evaluated at the mean temperature $\overline{T}$. Given that $T_w = 1173$ K and $T_g \approx 500$ K, the mean temperature is $\bar{T}=836.5$ K, and since the gas is mainly $H_2$, the physical properties are:
$\mu = 1.7 \times 10^{-5}$ kg/(m.s.)
$\rho = 0.029$ kg/m$^3$,
$C_p = 1.44 \times 10^4$ J/(kg.K),
$k = 0.30$ J/(m.s.K).

Therefore, the Grashof number for a 0.001 m diameter wire is Gr $=0.023$ and the Prandtl number is Pr$=0.82$. The product Gr.Pr$=0.019$, and from the correlation for free convection from long horizontal cylinders, the heat transfer coefficient $h_m$ is given by $h_m D/k=0.71$. Therefore, $h_m=231$ J/m$^2$.s.K). The rate of convective heat loss per metre length of wire is then $$\frac{Q}{L} = h_m A \frac{\Delta T}{L} = h_m \pi D \Delta T$$
$$= (213)(\pi)(0.001)(673) = 450 W/m.$$

Since the reactor hot-wire is 10 m long, the total convective heat loss is 4.5 kW.

The convective heat and mass transfer in the reactor can be related by the Chilton-Colburn analogy as:

$$\frac{h_m D}{k} = \frac{k_m D}{c D_{AB}} = 0.71, \quad (6)$$

where $k_m$ is the mass transfer coefficient (m/s); c is the total gas concentration (mole/m$^3$); and $D_{AB}$ is the diffusivity of the reacting species in the gas. For the purposes of the equilibration reaction, the rate limiting mass transfer step will be the diffusion of $CQ_4$ through the boundary layer at the wire surface. Since the gas is mostly $H_2$, the additional physical properties we require (at the mean temperature $\bar{T}$) for calculation of the mass transfer coefficient $k_m$ are:

$$D_{AB} = 3.4 \times 10^{-4} \, m^2/s \quad (7)$$

$$c = 14.4 \, mole/m^3. \quad (8)$$

Therefore, the mass transfer coefficient $k_m=3.5$ m/s. Since the mole fraction of $CQ_4$ is $x=0.04$, the rate of transport of $CQ_4$ per meter of the hot-wire is $$\frac{N}{L} = k_m A x c/L = h_m \pi D x c$$
$$= (3.5)(\pi)(0.001)(0.4)(14.4)$$
$$= 0.0064 \, mole/s = 3.94 \times 10^{21} = molecule/m/s.$$

Due to rapid convection, the bulk gaseous contents of the reactor can be considered to be well mixed. The mass transfer resistance which limits the rate of the reaction is due to diffusion through the boundary layer at the hot-wire surface.

Since the length of the hot-wire is 10 m, the mass transfer in the reactor is sufficient to transport 0.064 mole/s of $CQ_4$ to the hot-wire surface. Since reactor 16 contains a total of 0.034 mole of $CQ_4$, essentially all the $CQ_4$ in the reactor is contacted with the hot-wire every 0.53 s. Since the residence time in the reactor is 5 s, the rate of mass transfer to the surface is more than adequate. Therefore, the $CQ_4/H_2$ equilibration reaction rate will not be mass transfer limited.

Radiative Heat Transfer

Due to the high temperature of the hot-wire as compared to the reactor walls, there is radiant heat transfer from the wire to the walls, which contributes to the cooling requirement for the reactor. Since the wire occupies only a small part of the solid angle as seen from the wall, it is a good approximation to assume that very little of the radiation ever gets back to the wire; it is effectively radiating into a nearly blackbody. We then have as an upper limit to the radiant heat loss from the wire q (W/m):

$$q = \pi D \epsilon T_w \sigma^4 \quad (9)$$

where D is the wire diameter (m), $\sigma=5.67 \times 10^{-8}$ erg/(cm$^2$.s.K$^4$) is the Stefan-Boltzmann constant, $T_w=1173$ K is the temperature of the wire, and $\epsilon \approx 0.2$ is the emittance of the Pt wire at its operating temperature. Therefore, the radiant heat loss is 84 W/m, or 840 W for the entire 10 m length of the hot-wire.

CQ$_4$/H$_2$ Exchange

Exchange rates of hydrocarbons with deuterium over metal catalysts have been reviewed by G. C. Bond, "Catalysis of Metals", Academic Press, London, 1962. While there is little exchange rate data specifically for tritium, there have been detailed studies of the $CH_4/D_2$ system by C. Kemball. The exchange rates $CQ_4/Q_2$ for all Q can be expected to be similar in magnitude.

In general, for saturated hydrocarbons, there is a large measure of agreement between studies using various catalyst preparations, and the order of reactivity is:

methane <neopentane <ethane <propane
<isobutane <n-butane <all higher hydrocarbons.

This order reflects the strength of the carbon-hydrogen bond which is broken in the rate determining step. Since methane is the least reactive of all the saturated hydrocarbons, it is conservative to use methane data for the sizing of the reactor 16.

The activation energy $\Delta E$ for stepwise $Q_2/CQ_4$ exchange over Pt is about 105 kJ/mole. From data provided by Bond, the stepwise exchange rate r (molecules m$^{-2}$s$^{-1}$) on the surface of the metal is a function of absolute temperature T(K) according to

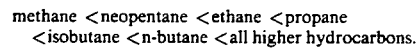

$$r = 2.0 \times 10^{30} e^{-\Delta E/RT} = 2.0 \times 10^{30} e^{-12629/T} \quad (10)$$

Therefore, if the Pt hot-wire is operated at a temperature of 1173 K, the exchange rate on the surface is $4.2 \times 10^{\approx}$ molecules m$^{-2}$s$^{-1}$.

Since the Pt hot-wire has a diameter of 0.001 m and a surface area of 0.00314 m$^2$/m, the exchange rate per meter of wire is $1.32 \times 10^{23}$ molecules/s. Since the wire has a length of 10 m and the $CQ_4$ flow through reactor 16 is 0.0068 mole/s or $4.1 \times 10^{21}$ molecules/s, the exchange rate on the hot-wire surface of the wire is approximately 322 times greater than the minimum required.

NQ$_3$/H$_2$O and Q$_2$O/H$_2$ Exchange

Generally, the rates of exchange of $NQ_3/H_2$ and $Q_2O/H_2$ on Pt are greater than for $CQ_4/H_2$. Therefore, these exchange reactions do not affect the sizing of reactor 16.

Conclusions

The invention described herein provides a new high temperature fuel processing loop design which may be used, for example, in the processing of exhaust gas from the International Thermonuclear Experimental Reactor (ITER).

The new design has advantages over previous loop designs which have been based on catalytic oxidation or decomposition of impurities, since it eliminates the need for impurity oxidation and electrolysis of DTO, and does not rely on complicated catalytic decomposition reactions.

In the present design, tritium is exchanged out of impurities such as tritiated methane, ammonia and water by swamping with $H_2$ and isotopically equilibrating the mixture in a high temperature reactor. The reactor consists of a horizontal tube with an axial Pt metal hot-wire operated at a temperature of 1173 K. The walls of the reactor are cooled to near room temperature to reduce permeation to negligible levels.

Downstream of the reactor is a Pd/Ag permeator for separation of hydrogen isotopes and impurities. The separated $H_2$/HT stream is then sent to the isotope separation system for tritium recovery.

The critical component in the design is the Pt hot-wire reactor. Design calculations are presented for the reactor, based on published equilibrium reaction rates, and heat and mass transfer theory.

We claim:

1. A process for recovering tritium from a gaseous mixture consisting of elemental hydrogen isotopes with impurities containing tritium in chemically bonded form, comprising:
   (a) separating the gaseous mixture into an impurity-free first fraction consisting essentially of elemental hydrogen isotopes and a second fraction containing the impurities,
   (b) adding tritium-lean hydrogen to the second fraction,
   (c) equilibrating the added hydrogen with the tritium-containing impurities of the second fraction,
   (d) separating the equilibrated mixture into an impurity-free enriched fraction consisting essentially of elemental hydrogen isotopes and a depleted fraction containing the impurities,
   (e) repeating steps (b), (c) and (d) in continuous cyclic sequence on said depleted fraction until the impurities are sufficiently depleted of tritium,
   (f) disposing of the depleted impurities, and
   (g) separating the isotopes of said impurity-free fractions.

2. A process according to claim 1, wherein the equilibrating step (c) occurs in a high temperature isotopic exchange reactor.

3. A process according to claim 2, wherein the equilibration occurs at a temperature of at least 1100° K.

4. A process according to claim 1, wherein the separation of said equilibrated mixture into impurity-free and impurity-containing fractions occurs in a Pd/Ag permeator.

5. A process according to claim 3, wherein the impurity-containing gas is continuously recycled through the reactor until the impurities are sufficiently depleted of tritium, the impurity-free gas being continuously separated for isotope recovery, and tritium-lean hydrogen being continuously added to the recycled gas to maintain a substantially constant gas pressure.

6. A batch process for recovering tritium from the exhaust gas of a fusion reactor, the exhaust gas comprising a mixture of elemental hydrogen isotopes with impurities containing chemically bonded tritium, the process comprising:
   (a) separating a batch of the exhaust gas to be treated into a first fraction consisting essentially of elemental hydrogen isotopes and a second fraction containing the impurities,
   (b) removing the first fraction to an isotope separation plant for recovering the tritium therefrom,
   (c) passing the second fraction to a pressure vessel,
   (d) adding tritium-lean hydrogen to the pressure vessel to establish a predetermined pressure therein,
   (e) delivering the contents of the pressure vessel to a high temperature isotopic exchange reactor to equilibrate the tritium-lean hydrogen with the tritium-containing impurities of said second fraction,
   (f) separating the equilibrated mixture into an impurity-free enriched fraction consisting essentially of elemental hydrogen isotopes and a depleted fraction containing the impurities,
   (g) removing the impurity-free fraction to an isotope separation plant for recovering the tritium therefrom,
   (h) returning the depleted impurity-containing fraction to the pressure vessel,
   (i) continuously recirculating the depleted impurity-containing gas through the pressure vessel and the reactor until the impurities are sufficiently depleted, while continuously removing the impurity-free fraction to the isotope separation plant, tritium-lean hydrogen being continuously added to the recirculated gas to maintain said predetermined pressure, and
   (j) disposing of the impurities.

7. A batch process according to claim 6, wherein prior to passing said second fraction to the pressure vessel, the pressure vessel is evacuated.

8. A process according to claim 7, wherein the equilibration occurs at a temperature of at least 1100° K.

9. A process according to claim 8, wherein the separation of the equilibrated mixture into impurity-free and impurity-containing fractions occurs in a Pd/Ag permeator.

10. A process according to claim 9, wherein the separation of the batch of exhaust gas into first and second fractions occurs in a Pd/Ag permeator.

11. A batch process according to claim 7, further comprising:
   separating a second batch of the exhaust gas to be treated into a first fraction consisting essentially of elemental hydrogen isotopes and a second fraction containing the impurities,
   removing the first fraction to an isotope separation plant,
   passing the second fraction to a second pressure vessel,
   adding tritium-lean hydrogen to the pressure vessel to establish a predetermined pressure therein, and
   upon completion of step (i), disconnecting the first pressure vessel from the reactor and connecting the second pressure vessel of the reactor,
   repeating steps (e), (f), (g), (h) and (i) for the second batch, and
   disposing of the impurities of the second batch.

12. A process for detritiating a gaseous mixture consisting of elemental hydrogen isotopes with impurities containing tritium in chemically bonded form, comprising:

(a) separating the gaseous mixture into an impurity-free first fraction consisting essentially of elemental hydrogen isotopes and a second fraction containing the impurities, (b) adding tritium-lean hydrogen to the second fraction, (c) equilibrating the added hydrogen with the tritium-containing impurities of the second fraction, (d) separating the equilibrated mixture into an impurity-free enriched fraction consisting essentially of elemental hydrogen isotopes and a depleted fraction containing the impurities, (e) repeating steps (b), (c), and (d) in cyclic sequence on said depleted fraction until the impurities are sufficiently depleted of tritium, (f) disposing of the depleted impurities, and (g) recovering said impurity-free fractions for subsequent isotope separation.

* * * * *